United States Patent
Weber et al.

(10) Patent No.: US 7,397,546 B2
(45) Date of Patent: Jul. 8, 2008

(54) SYSTEMS AND METHODS FOR REDUCING DETECTED INTENSITY NON-UNIFORMITY IN A LASER BEAM

(75) Inventors: Aaron Weber, Cambridge, MA (US); David H. Tracy, Norwalk, CT (US)

(73) Assignee: Helicos Biosciences Corporation, Cambridge, MA (US)

( * ) Notice: Subject to any disclaimer, the term of this patent is extended or adjusted under 35 U.S.C. 154(b) by 38 days.

(21) Appl. No.: 11/370,605

(22) Filed: Mar. 8, 2006

(65) Prior Publication Data

US 2007/0211467 A1    Sep. 13, 2007

(51) Int. Cl.
*G01J 1/00*    (2006.01)
(52) U.S. Cl. ..................................... 356/121
(58) Field of Classification Search .......... 356/121–123
See application file for complete search history.

(56) References Cited

U.S. PATENT DOCUMENTS

| | | | |
|---|---|---|---|
| 3,855,544 A * | 12/1974 | Bowness | 372/97 |
| 3,996,345 A | 12/1976 | Ullman et al. | |
| 4,119,368 A | 10/1978 | Yamazaki | |
| 4,153,855 A | 5/1979 | Feingold | |
| 4,344,064 A | 8/1982 | Bitler et al. | |
| 4,351,760 A | 9/1982 | Khanna et al. | |
| 4,596,461 A * | 6/1986 | DeRosa et al. | 356/121 |
| 4,707,237 A | 11/1987 | Lepp et al. | |
| 4,725,677 A | 2/1988 | Koster et al. | |
| 4,757,141 A | 7/1988 | Fung et al. | |
| 4,793,705 A | 12/1988 | Shera | |
| 4,811,218 A | 3/1989 | Hunkapiller et al. | |
| 4,863,849 A | 9/1989 | Melamede | |
| 4,871,250 A * | 10/1989 | Koseki | 356/121 |
| 4,942,124 A | 7/1990 | Church | |
| 4,962,037 A | 10/1990 | Jett et al. | |

(Continued)

FOREIGN PATENT DOCUMENTS

EP    0579997 A1    1/1994

(Continued)

OTHER PUBLICATIONS

U.S. Appl. No. 12/043,077, filed Mar. 5, 2008, Weber.

(Continued)

*Primary Examiner*—Hoa Q Pham
(74) *Attorney, Agent, or Firm*—Cooley Godward Kronish LLP

(57) ABSTRACT

A method of increasing the spatial uniformity of the detected intensity of a beam of light from a laser in a system including the laser and a light detector. In one embodiment the method includes the steps of generating a beam of light with the laser; and moving the beam of light and the light detector relative to each other, such that the detector averages the spatial intensity of the beam of light over time. In another embodiment the invention relates to a system for increasing the detected spatial uniformity of the intensity of a beam of light. In one embodiment the system comprises a light detector; a laser source for generating the beam of light; and a means for moving the beam of light and the detector relative to one another such that the detector averages the intensity of the light beam over time.

14 Claims, 7 Drawing Sheets

U.S. PATENT DOCUMENTS

| | | | |
|---|---|---|---|
| 4,994,373 A | 2/1991 | Stavrianopoulos et al. | |
| 5,076,678 A * | 12/1991 | Grossman et al. | 359/710 |
| 5,091,652 A | 2/1992 | Mathies et al. | |
| 5,096,388 A | 3/1992 | Weinberg | |
| 5,096,554 A | 3/1992 | Chin | |
| 5,108,892 A | 4/1992 | Burke et al. | |
| 5,112,736 A | 5/1992 | Caldwell et al. | |
| RE34,069 E | 9/1992 | Kosler et al. | |
| 5,143,854 A | 9/1992 | Pirrung et al. | |
| 5,167,784 A | 12/1992 | Noolandi | |
| 5,171,132 A | 12/1992 | Miyazaki et al. | |
| 5,198,540 A | 3/1993 | Koster | |
| 5,209,834 A | 5/1993 | Shera | |
| 5,224,843 A | 7/1993 | Van Lintel | |
| 5,242,797 A | 9/1993 | Hirschfeld | |
| 5,259,737 A | 11/1993 | Kamisuki et al. | |
| 5,260,433 A | 11/1993 | Engelhardt et al. | |
| 5,265,327 A | 11/1993 | Faris et al. | |
| 5,267,152 A | 11/1993 | Yang et al. | |
| 5,302,509 A | 4/1994 | Cheeseman | |
| 5,304,487 A | 4/1994 | Wilding et al. | |
| 5,306,403 A | 4/1994 | Vo-Dinh | |
| 5,336,062 A | 8/1994 | Richter | |
| 5,360,523 A | 11/1994 | Middendorf et al. | |
| 5,375,979 A | 12/1994 | Trah | |
| 5,376,252 A | 12/1994 | Ekstrom et al. | |
| 5,403,709 A | 4/1995 | Agrawal et al. | |
| 5,405,747 A | 4/1995 | Jett et al. | |
| 5,405,783 A | 4/1995 | Pirrung et al. | |
| 5,409,811 A | 4/1995 | Tabor et al. | |
| 5,424,186 A | 6/1995 | Fodor et al. | |
| 5,471,300 A * | 11/1995 | Ryan et al. | 356/519 |
| 5,484,701 A | 1/1996 | Cocuzza et al. | |
| 5,514,256 A | 5/1996 | Douthart et al. | |
| 5,518,900 A | 5/1996 | Nikiforov et al. | |
| 5,529,465 A | 6/1996 | Zengerle et al. | |
| 5,534,125 A | 7/1996 | Middendorf et al. | |
| 5,547,839 A | 8/1996 | Dower et al. | |
| 5,556,790 A | 9/1996 | Pettit | |
| 5,558,991 A | 9/1996 | Trainor | |
| 5,599,695 A | 2/1997 | Pease et al. | |
| 5,610,287 A | 3/1997 | Nikiforov et al. | |
| 5,631,734 A | 5/1997 | Stern et al. | |
| 5,632,957 A | 5/1997 | Heller et al. | |
| 5,654,149 A | 8/1997 | Mendoza et al. | |
| 5,659,171 A | 8/1997 | Young et al. | |
| 5,670,346 A | 9/1997 | Reeve et al. | |
| 5,674,716 A | 10/1997 | Tabor et al. | |
| 5,675,155 A | 10/1997 | Pentoney, Jr. et al. | |
| 5,688,648 A | 11/1997 | Mathies et al. | |
| 5,705,018 A | 1/1998 | Hartley | |
| 5,707,506 A | 1/1998 | Douthart et al. | |
| 5,710,628 A | 1/1998 | Waterhouse et al. | |
| 5,712,476 A | 1/1998 | Renfrew et al. | |
| 5,733,729 A | 3/1998 | Lipshutz et al. | |
| 5,741,640 A | 4/1998 | Fuller | |
| 5,741,644 A | 4/1998 | Kambara et al. | |
| 5,744,305 A | 4/1998 | Fodor et al. | |
| 5,744,312 A | 4/1998 | Mamone et al. | |
| 5,750,341 A | 5/1998 | Macevicz et al. | |
| 5,753,788 A | 5/1998 | Fodor et al. | |
| 5,755,943 A | 5/1998 | Middendorf et al. | |
| 5,756,285 A | 5/1998 | Fuller | |
| 5,759,014 A | 6/1998 | Van Lintel | |
| 5,759,374 A | 6/1998 | Takahashi et al. | |
| 5,762,876 A | 6/1998 | Lincoln et al. | |
| 5,776,767 A | 7/1998 | Stevens et al. | |
| 5,776,782 A | 7/1998 | Tsuji | |
| 5,795,782 A | 8/1998 | Church et al. | |
| 5,837,832 A | 11/1998 | Chee et al. | |
| 5,837,860 A | 11/1998 | Anderson et al. | |
| 5,838,449 A * | 11/1998 | Kato et al. | 356/399 |
| 5,861,287 A | 1/1999 | Metzker et al. | |
| 5,863,722 A | 1/1999 | Brenner | |
| 5,889,165 A | 3/1999 | Fodor et al. | |
| 5,902,723 A | 5/1999 | Dower et al. | |
| 5,908,755 A | 6/1999 | Kumar et al. | |
| 5,928,906 A | 7/1999 | Koster et al. | |
| 5,938,118 A * | 8/1999 | Cooper | 239/102.2 |
| 5,945,283 A | 8/1999 | Kwok et al. | |
| 5,945,312 A | 8/1999 | Goodman et al. | |
| 5,945,325 A | 8/1999 | Arnold et al. | |
| 5,952,174 A | 9/1999 | Nikiforov et al. | |
| 5,954,932 A | 9/1999 | Takahashi et al. | |
| 5,958,703 A | 9/1999 | Dower et al. | |
| 5,968,740 A | 10/1999 | Fodor et al. | |
| 5,974,164 A | 10/1999 | Chee | |
| 5,976,338 A | 11/1999 | Fujita et al. | |
| 5,994,085 A | 11/1999 | Cantor | |
| 6,002,471 A | 12/1999 | Quake | |
| 6,028,190 A | 2/2000 | Mathies et al. | |
| 6,043,080 A | 3/2000 | Lipshutz et al. | |
| 6,066,454 A | 5/2000 | Lipshutz et al. | |
| 6,071,394 A | 6/2000 | Cheng et al. | |
| 6,077,664 A | 6/2000 | Slater et al. | |
| 6,087,095 A | 7/2000 | Rosenthal et al. | |
| 6,107,044 A | 8/2000 | Nikiforov | |
| 6,132,580 A | 10/2000 | Mathies et al. | |
| 6,143,151 A | 11/2000 | Middendorf et al. | |
| 6,197,506 B1 | 3/2001 | Fodor et al. | |
| 6,197,595 B1 | 3/2001 | Anderson et al. | |
| 6,207,381 B1 | 3/2001 | Larsson et al. | |
| 6,210,896 B1 | 4/2001 | Chan | |
| 6,214,246 B1 | 4/2001 | Craighead | |
| 6,221,654 B1 | 4/2001 | Quake et al. | |
| 6,225,625 B1 | 5/2001 | Pirrung et al. | |
| 6,228,593 B1 | 5/2001 | Lipshutz et al. | |
| 6,232,075 B1 | 5/2001 | Williams | |
| 6,242,180 B1 | 6/2001 | Chee | |
| 6,255,083 B1 | 7/2001 | Williams | |
| 6,268,152 B1 | 7/2001 | Fodor et al. | |
| 6,269,846 B1 | 8/2001 | Overbeck et al. | |
| 6,270,644 B1 | 8/2001 | Mathies et al. | |
| 6,274,320 B1 | 8/2001 | Rothberg et al. | |
| 6,284,460 B1 | 9/2001 | Fodor et al. | |
| 6,287,821 B1 | 9/2001 | Shi et al. | |
| 6,294,337 B1 | 9/2001 | Hayashizaki | |
| 6,310,189 B1 | 10/2001 | Fodor et al. | |
| 6,344,325 B1 | 2/2002 | Quake et al. | |
| 6,346,413 B1 | 2/2002 | Fodor et al. | |
| 6,355,420 B1 | 3/2002 | Chan | |
| 6,355,432 B1 | 3/2002 | Fodor et al. | |
| 6,395,559 B1 | 5/2002 | Swenson | |
| 6,403,311 B1 | 6/2002 | Chan | |
| 6,403,957 B1 | 6/2002 | Fodor et al. | |
| 6,451,536 B1 | 9/2002 | Fodor et al. | |
| 6,479,267 B1 | 11/2002 | Davis et al. | |
| 6,485,944 B1 | 11/2002 | Church et al. | |
| 6,506,560 B1 | 1/2003 | Hughes et al. | |
| 6,511,803 B1 | 1/2003 | Church et al. | |
| 6,537,757 B1 | 3/2003 | Langmore et al. | |
| 6,546,340 B2 | 4/2003 | Lipshutz et al. | |
| 6,551,784 B2 | 4/2003 | Fodor et al. | |
| 6,551,817 B2 | 4/2003 | Besemer et al. | |
| 6,576,424 B2 | 6/2003 | Fodor et al. | |
| 6,610,482 B1 | 8/2003 | Fodor et al. | |
| 6,750,018 B2 | 6/2004 | Kambara et al. | |
| 6,787,308 B2 | 9/2004 | Balasubramanian et al. | |
| 7,193,693 B2 * | 3/2007 | Yazaki et al. | 356/30 |
| 2001/0024790 A1 | 9/2001 | Kambara et al. | |
| 2002/0025529 A1 | 2/2002 | Quake et al. | |
| 2002/0119484 A1 | 8/2002 | Weidenhammer et al. | |
| 2002/0123046 A1 | 9/2002 | Smith et al. | |
| 2002/0137046 A1 | 9/2002 | Koster | |

| | | | | | |
|---|---|---|---|---|---|
| 2002/0137052 A1 | 9/2002 | Bridgham et al. | GB | 2155152 | 9/1985 |
| 2002/0137062 A1 | 9/2002 | Williams et al. | GB | 2308460 | 6/1997 |
| 2002/0138205 A1 | 9/2002 | Miller et al. | GB | 2400518 A | 10/2004 |
| 2002/0142329 A1 | 10/2002 | Matray et al. | WO | 90/13666 A1 | 11/1990 |
| 2002/0142333 A1 | 10/2002 | Gelfand et al. | WO | 90/15070 A1 | 12/1990 |
| 2002/0146704 A1 | 10/2002 | Head et al. | WO | 91/06678 A1 | 5/1991 |
| 2002/0146726 A1 | 10/2002 | Matray et al. | WO | 92/10092 A1 | 6/1992 |
| 2002/0150903 A1 | 10/2002 | Koster | WO | 92/10587 A1 | 6/1992 |
| 2002/0150938 A1 | 10/2002 | Kneipp et al. | WO | 93/06121 A1 | 4/1993 |
| 2002/0164629 A1 | 11/2002 | Quake et al. | WO | 93/21340 A1 | 10/1993 |
| 2002/0168642 A1 | 11/2002 | Drukier | WO | 95/12608 A1 | 5/1995 |
| 2002/0168678 A1 | 11/2002 | Williams et al. | WO | 95/27080 A1 | 10/1995 |
| 2002/0172948 A1 | 11/2002 | Perlin | WO | 96/04547 A1 | 2/1996 |
| 2002/0177129 A1 | 11/2002 | Paabo et al. | WO | 96/12014 A1 | 4/1996 |
| 2002/0182601 A1 | 12/2002 | Sampson et al. | WO | 96/12039 | 4/1996 |
| 2002/0192661 A1 | 12/2002 | Paabo et al. | WO | 96/27025 | 9/1996 |
| 2002/0192662 A1 | 12/2002 | Boyce-Jacino et al. | WO | 97/02488 | 1/1997 |
| 2002/0192691 A1 | 12/2002 | Drmanac | WO | 97/22076 | 6/1997 |
| 2002/0197618 A1 | 12/2002 | Sampson | WO | 97/23650 | 7/1997 |
| 2003/0003498 A1 | 1/2003 | Digby et al. | WO | 97/37041 | 10/1997 |
| 2003/0008285 A1 | 1/2003 | Fischer | WO | 97/39150 | 10/1997 |
| 2003/0017461 A1 | 1/2003 | Singh et al. | WO | 97/40184 | 10/1997 |
| 2003/0022207 A1 | 1/2003 | Balasubramanian et al. | WO | 97/41258 | 11/1997 |
| 2003/0027140 A1 | 2/2003 | Ju et al. | WO | 97/41259 | 11/1997 |
| 2003/0036080 A1 | 2/2003 | Jensen et al. | WO | 97/42348 | 11/1997 |
| 2003/0044778 A1 | 3/2003 | Goelet et al. | WO | 98/00708 | 1/1998 |
| 2003/0044779 A1 | 3/2003 | Goelet et al. | WO | 98/02575 | 1/1998 |
| 2003/0044781 A1 | 3/2003 | Korlach et al. | WO | 98/03684 | 1/1998 |
| 2003/0044816 A1 | 3/2003 | Denison et al. | WO | 98/07069 | 2/1998 |
| 2003/0054181 A1 | 3/2003 | Swerdlow et al. | WO | 98/08978 | 3/1998 |
| 2003/0054361 A1 | 3/2003 | Heller | WO | 98/13523 A1 | 4/1998 |
| 2003/0058440 A1 | 3/2003 | Scott et al. | WO | 98/20019 | 5/1998 |
| 2003/0058799 A1 | 3/2003 | Yamakawa et al. | WO | 98/20020 A2 | 5/1998 |
| 2003/0059778 A1 | 3/2003 | Berlin et al. | WO | 98/20166 | 5/1998 |
| 2003/0060431 A1 | 3/2003 | Simmonds et al. | WO | 98/21361 | 5/1998 |
| 2003/0064366 A1 | 4/2003 | Hardin et al. | WO | 98/27228 | 6/1998 |
| 2003/0064398 A1 | 4/2003 | Barnes | WO | 98/28440 A1 | 7/1998 |
| 2003/0064483 A1 | 4/2003 | Shaw et al. | WO | 98/33939 A1 | 8/1998 |
| 2003/0087237 A1 | 5/2003 | Hong et al. | WO | 98/40520 | 9/1998 |
| 2003/0087300 A1 | 5/2003 | Knapp et al. | WO | 98/41650 | 9/1998 |
| 2003/0092005 A1 | 5/2003 | Levene et al. | WO | 98/41657 A1 | 9/1998 |
| 2003/0092007 A1 | 5/2003 | Gibbs et al. | WO | 98/44152 | 10/1998 |
| 2003/0096258 A1 | 5/2003 | Fu et al. | WO | 98/45481 A1 | 10/1998 |
| 2003/0100006 A1 | 5/2003 | Senapathy | WO | 98/53300 | 11/1998 |
| 2003/0104437 A1 | 6/2003 | Barnes et al. | WO | 98/54669 | 12/1998 |
| 2003/0104466 A1 | 6/2003 | Knapp et al. | WO | 98/55593 | 12/1998 |
| 2003/0108867 A1 | 6/2003 | Chee et al. | WO | 99/01768 | 1/1999 |
| 2003/0138809 A1 | 7/2003 | Williams et al. | WO | 99/05221 | 2/1999 |
| 2003/0148344 A1 | 8/2003 | Rothberg et al. | WO | 99/05315 A2 | 2/1999 |
| 2003/0162213 A1 | 8/2003 | Fuller et al. | WO | 99/06422 | 2/1999 |
| 2003/0186227 A1 | 10/2003 | Balasubramanian et al. | WO | 99/13109 | 3/1999 |
| 2003/0186255 A1 | 10/2003 | Williams et al. | WO | 99/13110 | 3/1999 |
| 2003/0190627 A1 | 10/2003 | Zhao et al. | WO | 99/17093 | 4/1999 |
| 2003/0190647 A1 | 10/2003 | Odera | WO | 99/19516 | 4/1999 |
| 2003/0190663 A1 | 10/2003 | Yang et al. | WO | 99/24797 | 5/1999 |
| 2003/0194722 A1 | 10/2003 | Odedra et al. | WO | 99/27137 A1 | 6/1999 |
| 2003/0194740 A1 | 10/2003 | Williams | WO | 99/31278 | 6/1999 |
| 2004/0029115 A9 | 2/2004 | Dower et al. | WO | 99/37810 A1 | 7/1999 |
| 2004/0054162 A1 | 3/2004 | Hanna | WO | 99/39001 | 8/1999 |
| 2004/0106110 A1 | 6/2004 | Balasubramanian et al. | WO | 99/40105 A2 | 8/1999 |
| 2004/0126770 A1 | 7/2004 | Kumar et al. | WO | 99/40223 | 8/1999 |
| | | | WO | 99/41410 | 8/1999 |
| FOREIGN PATENT DOCUMENTS | | | WO | 99/44045 | 9/1999 |
| | | | WO | 99/45153 | 9/1999 |
| EP | 0703364 | 3/1996 | WO | 99/47539 | 9/1999 |
| EP | 0706004 A2 | 4/1996 | WO | 99/47706 | 9/1999 |
| EP | 0779436 A2 | 6/1997 | WO | 99/53423 | 10/1999 |
| EP | 0845603 | 6/1998 | WO | 99/61888 A2 | 12/1999 |
| EP | 0932700 B1 | 8/1999 | WO | 99/64437 | 12/1999 |
| EP | 0946752 B1 | 10/1999 | WO | 99/64840 | 12/1999 |
| EP | 0955085 A2 | 11/1999 | WO | 99/65938 | 12/1999 |
| EP | 0999055 A2 | 5/2000 | WO | 99/66076 A1 | 12/1999 |
| EP | 0706004 B1 | 8/2003 | WO | 99/66313 A1 | 12/1999 |

| | | |
|---|---|---|
| WO | 00/00637 | 1/2000 |
| WO | 00/06770 A1 | 2/2000 |
| WO | 00/09753 | 2/2000 |
| WO | 00/11223 A1 | 3/2000 |
| WO | 00/17397 | 3/2000 |
| WO | 00/26935 A2 | 5/2000 |
| WO | 00/34523 A1 | 6/2000 |
| WO | 00/37680 A1 | 6/2000 |
| WO | 00/40750 A1 | 7/2000 |
| WO | 00/40758 | 7/2000 |
| WO | 00/42223 | 7/2000 |
| WO | 00/43540 A1 | 7/2000 |
| WO | 00/43752 | 7/2000 |
| WO | 00/50642 A1 | 8/2000 |
| WO | 00/53805 A1 | 9/2000 |
| WO | 00/53812 A2 | 9/2000 |
| WO | 00/56937 | 9/2000 |
| WO | 00/58507 A1 | 10/2000 |
| WO | 00/58516 A2 | 10/2000 |
| WO | 00/68410 | 11/2000 |
| WO | 00/70073 A1 | 11/2000 |
| WO | 00/71755 | 11/2000 |
| WO | 00/79007 | 12/2000 |
| WO | 01/01025 A3 | 1/2001 |
| WO | 01/16375 | 3/2001 |
| WO | 01/23610 A2 | 4/2001 |
| WO | 01/24937 A2 | 4/2001 |
| WO | 01/25480 | 4/2001 |
| WO | 01/31055 A2 | 5/2001 |
| WO | 01/32930 A1 | 5/2001 |
| WO | 01/38574 | 5/2001 |
| WO | 01/48184 A2 | 5/2001 |
| WO | 01/42496 A2 | 6/2001 |
| WO | 01/57248 A2 | 8/2001 |
| WO | 01/57249 A1 | 8/2001 |
| WO | 01/61044 | 8/2001 |
| WO | 01/64838 | 9/2001 |
| WO | 01/75154 | 10/2001 |
| WO | 01/79536 | 10/2001 |
| WO | 01/85991 | 11/2001 |
| WO | 01/92284 | 12/2001 |
| WO | 01/96607 | 12/2001 |
| WO | 02/00343 A2 | 1/2002 |
| WO | 02/02584 | 1/2002 |
| WO | 02/02795 | 1/2002 |
| WO | 02/02813 A2 | 1/2002 |
| WO | 02/03305 A2 | 1/2002 |
| WO | 02/04680 A2 | 1/2002 |
| WO | 02/20836 | 3/2002 |
| WO | 02/20837 A2 | 3/2002 |
| WO | 02/27032 | 4/2002 |
| WO | 02/29106 A2 | 4/2002 |
| WO | 02/30486 A3 | 4/2002 |
| WO | 02/35441 A2 | 5/2002 |
| WO | 02/36832 | 5/2002 |
| WO | 02/44414 | 6/2002 |
| WO | 02/061126 A2 | 8/2002 |
| WO | 02/061127 A2 | 8/2002 |
| WO | 02/072779 A2 | 9/2002 |
| WO | 02/072892 A1 | 9/2002 |
| WO | 02/077694 | 10/2002 |
| WO | 02/079519 | 10/2002 |
| WO | 02/088381 A2 | 11/2002 |
| WO | 02/088382 A2 | 11/2002 |
| WO | 02/097113 | 12/2002 |
| WO | 02/099398 | 12/2002 |
| WO | 03/002767 | 1/2003 |
| WO | 03/016565 A2 | 2/2003 |
| WO | 03/020968 A2 | 3/2003 |
| WO | 03/021010 | 3/2003 |
| WO | 03/031947 A2 | 4/2003 |
| WO | 03/044678 | 5/2003 |
| WO | 03/048178 | 6/2003 |
| WO | 03/048991 | 6/2003 |
| WO | 03/062897 | 7/2003 |
| WO | 2004/061119 | 7/2004 |
| WO | 2004/074503 | 9/2004 |

OTHER PUBLICATIONS

Adam et al., "Individual genomes targeted in sequencing revolution", *Nature*, vol. 411, p. 402 (May 2001).

Ambrose, W. et al., "Single Molecule Detection With Total Internal Reflection Excitation: Comparing Signal-to-Background and Total Signals in Different Geometries", *Cytometry*, vol. 36, pp. 224-231 (1999).

Basche, T. et al., "Single Molecule Optical Detection, Imaging and Spectroscopy", Chs. 2 and 3, Weinheim:VCM, Germany (1997).

Bennett et. al., "Solexa Sequencing chemistry can be applied to different platforms which will have common elements in detection and data processing." Pharmacogenomics (2004) 5(4).

Brackmann et. al, "Optimal Enzymes for Single-Molecule Sequencing" 18, D-04103 (2004).

Braslavsky, I. et al., "Sequence information can be obtained from single DNA molecules", *PNAS*, vol. 100, No. 7, pp. 3960-3964 (Apr. 2003).

Braslavsky, I. et al., "Objective-type dark-field illumination for scattering from microbeads", *Applied Optics*, vol. 40, No. 31, pp. 5650-5657, (Nov. 2001).

Braslavsky, I. et al., "Single Molecule Measurements of DNA Polymerase Activity: A Step Towards Single Molecule Sequencing", *Biophys. 1. Abstracts*, p. 507A (2002).

Bryzek, J. et al., "Micromachines on the march", *IEEE Spectrum*, vol. 31, No. 5, pp. 20-31, (1994).

Buchaillot, L. et al., "Silicon Nitride Thin Films Young's Modulus Determination by an Optical Non Destructive Method", *Jpn. J. Appl. Phys.*, vol. 36, pp. L794-7, (Jun. 1997).

Burghardt, T. et al., "Total Internal Reflection Fluorescence Study of Energy Transfer in Surface-Adsorbed and Dissolved Bovine Serum Albumin", *Biochemistry*, vol. 22, pp. 979-985 (1983).

Chicurel, M., "Faster, better, cheaper genotyping", *Nature*, vol. 412, Issue 6847, pp. 580-582, (Aug. 2001).

Cooper, J. et al., "Analysis of Fluorescence Energy Transfer in Duplex and Branched DNA Molecules", *Biochemistry*, vol. 29, pp. 9261-9268 (1990).

Crocker, J.C. and D.G. Grier, "Methods of digital video microscopy for colloidal studies." Journal of Colloid and Interface Science, 1996. 179(1): p. 298-310.

Decher G.;et al., "Fuzzy nanoassemblies : Toward layered polymeric multicomposites." Science, 1997.277(5330): p. 1232-1237.

Dickson et al., "Simultaneous Imaging of Individual Molecules aligned both parallel and perpendicular to the optic axis" vol. 81, No. 24, 1998.

Ferguson, et al., "A fiber-optic DNA biosensor microarray for the analysis of gene expression," Nature Biotechnology, vol. 14, pp. 1681-1684 (1996).

Forster, T., "Delocalized Excitation and Excitation Transfer", Modem Quantum Chem., *Istanbul Lectures*, Part TII, pp. 93-137, Academic Press, New York (1965).

Funatsu, T. et al., "Imaging of single fluorescent molecules and individual ATP turnovers by single myosin molecules in aqueous solution", *Nature*, vol. 374, pp. 555-559 (Apr. 1995).

Ha, "Single molecule spectroscopy with automated positioning," Appl. Phys. Lett. 70, No. 6, Feb. 10, 1997, 782-784.

Ha, T., "Single-molecue fluorescence resonance energy transfer." Methods, 2001. 25(1): p. 78-86.

Houseal, T. et al., "Real-time imaging of single DNA molecules with fluorescence microscopy", *Biophys. I.*, vol. 56, pp. 507-516 (Sep. 1989).

Hyman, E., "A New Method of Sequencing DNA", *Anal. Biochem.*, 174:423-435 (1988).

Jett, J. et al., "High-Speed DNA Sequencing: An Approach Based Upon Fluorescence Detection of Single Molecules", *J Biomolecular Structure & Dynamics*, vol. 7, No. 2, pp. 301-309, (1989).

Kambara, H. et al., "Optimization of Parameters in a DNA Sequenator using Fluorescence Detection", *BiofIchnoloflY*, vol. 6, pp. 816-821 (1988).

Kartalov et al., "Single-Molecule Detection and DNA Sequencing-by-Synthesis," In Partial Fulfillment of the Requirements for the Degree of Doctor Philosophy, California Institute of technology, pp. 1-160 (2004).

Lazowski, K. et al., "Highly Sensitive Detection of Hybridization of OligonucleotideS to Specific Sequences of Nucleic Acids by Application of Fluorescence Resonance Energy Transfer", *Antisense and Nucleic Acid Dru Dev.*, vol. 10, pp. 97-103 (2000).

Lee, Y. et al., "Laser-Induced Fluorescence Detection of a Single Molecule in a Capillary", *Anal. Chern.*, vol. 66, pp. 4142-4149 (1994).

Levene, M. et al., "Zero-Mode Waveguides for Single-Molecule Analysis at High Concentrations", *Science*, 299:682-686 (Jan. 2003).

Marriott, G. et al., "Time resolved imaging microscopy—Phosphorescence and delayed fluorescence imaging", *Biophys. J.*, vol. 60, pp. 1374-1387 (Dec. 1991).

Marziali, A. and M. Akeson, "New DNA sequencing methods." Annual Review of Biomedical Engineering, 2001.3: p. 195-223.

Mastrangelo, C. et al., "Vacuum-Sealed Silicon Micromachined Incandescent Light Source", *IDEM*, 89:503-506 (1989).

Meiners, J.0 and S.R. Quake, "Femonewton force spectroscopy of single extended DNA. molecules." Phys Rev Lett, 2000. 84(21): p. 5014-7.

Meller, A., et al., "Rapid nanopore discrimination between single polynucleotide molecules." Proceedings of the National Acedemy of Sciences of the United States of America, 2000.97(3): p. 1079-1084.

Mertz, J. et al., "Single-molecule detection by two-photon-excited fluorescence", *Optics Letters*, vol. 20, No. 24, pp. 2532-2534 (Dec. 1995).

Quake, S. et al., "Fluorescent Photobleaching Method for Sequencing DNA", pp. 1-10, circa 1996.

Quake, Stephen R. et al., "Methods and Apparatuses For Analyzing Polynucleotide Sequences", pending U.S. Appl. No. 09/707,737, filed Nov. 6, 2000.

Quake, S. et al., "Polymer Physics with Single Molecules of DNA" (Dept. of Physics), a colloquirn by Stephen Quake, Standford University, Feb. 22, 1996. (Presented at Laser Spectroscopy XII Intl. Conference, Italy, Jun. 1995.).

Quake, S. et al., "From Micro- to Nanofabrication with Soft Materials", Science, vol. 290, No. 5496, pp. 1536-1540 (Nov. 2000).

Seeger, S. et al., "Single molecule fluorescence—High Performance Molecular Diagnosis and Screening", translated from *B1 Oforum*, pp. 179-185, Apr. 1998.

Selvin, P., "Fluorescence Resonance Energy Transfer", Meth. In Enzymology, vol. 246, pp. 300-335, Academic Press (1995).

Smith, L. et al., "Fluorescence detection in automated DNA sequence analysis", *Nature*, vol. 321, pp. 674-679 (Jun. 1986).

Tokunaga, M. et al., "Single Molecule Imaging of Fluorophores and Enzymatic Reactions Achieved by Objective-Type Total Internal Reflection Fluorescence Microscopy", *Biochem. And Biophys. Res. Comm.*, vol. 235, PD. 47-53 (1997).

Unger, M. et al., "Single-Molecule Fluorescence Observed with Mercury Lamp Illumination", *BioTechniques*, vol. 27, PD. 1008-1014 (Nov. 1999).

Xia et al., "Complex optical surfaces formed by replica molding against elastomeric masters," Science vol. 273, pp. 347-349 (1996).

Yazdi, N. et al., "Micromachined Inertial Sensors", *Proceedings of the IEEE*, vol. 86, No., pp. 1640-1659 (Aug. 1998).

\* cited by examiner

SYSTEMS AND METHODS FOR REDUCING DETECTED INTENSITY NON-UNIFORMITY IN A LASER BEAM

FIELD OF THE INVENTION

The present invention relates to lasers, and specifically to improved methods for reducing detected intensity non-uniformity in a laser beam.

BACKGROUND OF THE INVENTION

Many measurements require the use of a laser as a source of light. For example, lasers are used in systems ranging from imaging to the detection of gene sequences. In such systems various types of lasers are used, including gas lasers, chemical lasers, excimer lasers, solid-state lasers, semiconductor lasers (including diode lasers), dye lasers and hollow cathode sputtering metal ion lasers. Each type of laser has its own set of advantages and disadvantages when used for a specific application. For example, the characteristics of the different types of lasers including power output, wavelength, cost, size, tunability and uniformity of intensity over a cross-section of the beam are either advantages or disadvantages depending on the application in which the laser is used.

Diode lasers are low cost, have a relatively high power output and are small in size. A diode laser includes a radiating area or facet that has a very low aspect (height to width) ratio. That is, the height of the radiating facet is much smaller than its width. The beam produced by the laser diode facet is not uniform in intensity across the radiating facet. Because of the lack of uniformity in beam intensity, laser diodes cannot be used in applications where beam intensity uniformity is required. Therefore, in applications in which high power and uniformity are required other lasers such as gas lasers, which are more expensive and quite large, are generally used.

In many applications, decreasing the cost and size of the laser greatly decreases overall equipment and hence research costs. Thus, a method or system to decrease the detected non-uniformity in the intensity of a diode laser beam could increase the efficiency and decrease the size of the equipment used in selected applications.

The present invention addresses the problem of detected beam intensity non-uniformity in a laser beam of light.

SUMMARY OF THE INVENTION

This invention relates to systems and methods of reducing detected intensity non-uniformity of a laser diode beam so that laser diodes can be implemented in circumstances requiring a detection of a uniform beam of laser light.

In one aspect the invention relates to a method of increasing the spatial uniformity of the detected intensity of a beam of light from a laser in a system including the laser and a light detector. In one embodiment the method includes the steps of generating a beam of light with the laser; and moving the beam of light and the light detector relative to each other, such that the detector averages the spatial intensity of the beam of light over time. In another embodiment the step of moving the beam comprises the step of passing the beam of light into a two-dimensional retroreflector and moving a reflective wall of the retroreflector. In yet another embodiment the step of moving the beam comprises passing the beam into a rotating polygon, which may be a transparent polygon. In yet another embodiment, the step of moving the beam comprises physically moving the light source relative to the detector.

In another aspect the invention relates to a system for increasing the detected spatial uniformity of the intensity of a beam of light. In one embodiment, the system comprises a light detector, a laser source for generating the beam of light, and a means for moving the beam of light and the detector relative to one another such that the detector averages the intensity of the light beam over time. In another embodiment the, system includes a retroreflector, having a moving reflective wall, into which is passed the beam of light. In yet another embodiment the system includes a rotating transparent polygon through which is passed the beam of light.

In another aspect, the invention relates to a system for increasing the detected spatial uniformity of the intensity of a beam of light. In one embodiment, the system includes a light detector; a laser source for generating the beam of light; and a translator for moving the beam of light and the detector relative to each other such that the detector averages the intensity of the light beam over time. In another embodiment, the laser source is a laser diode. In another embodiment, the translator comprises a corner cube reflector having a moving reflective wall into which is passed the beam of light. In yet another embodiment, the translator comprises a rotating transparent polygon through which is passed the beam of light. In another embodiment the translator comprises a translator physically moving the light source relative to the detector.

Another aspect the invention relates to an apparatus for moving a beam of light in a direction perpendicular to its direction of propagation. In one embodiment the apparatus includes a first reflective surface; a second reflective surface oriented orthogonal to the first reflective surface; and a translator moving the first and second reflective surfaces relative to each other. In another embodiment the translator is a piezoelectric transducer driven by a waveform generator. In yet another embodiment the translator is a speaker cone driven by a waveform generator. In still yet another embodiment the speaker cone is a subwoofer.

BRIEF DESCRIPTION OF THE DRAWINGS

These embodiments and other aspects of this invention will be readily apparent from the detailed description below and the appended drawings, which are meant to illustrate and not to limit the invention, and in which.

DETAILED DESCRIPTION OF THE PREFERRED EMBODIMENTS

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

In general, the solution to the problem of spatial non-uniformity in the detected intensity of the light beam from a laser is to move the light beam, which typically is larger than the detector, and the detector relative to each other such that the detector "sees" the spatial variations in the intensity of the beam as it crosses the detector and averages them. One way to produce such relative movement is by use of a retroreflector.

Figure 1:
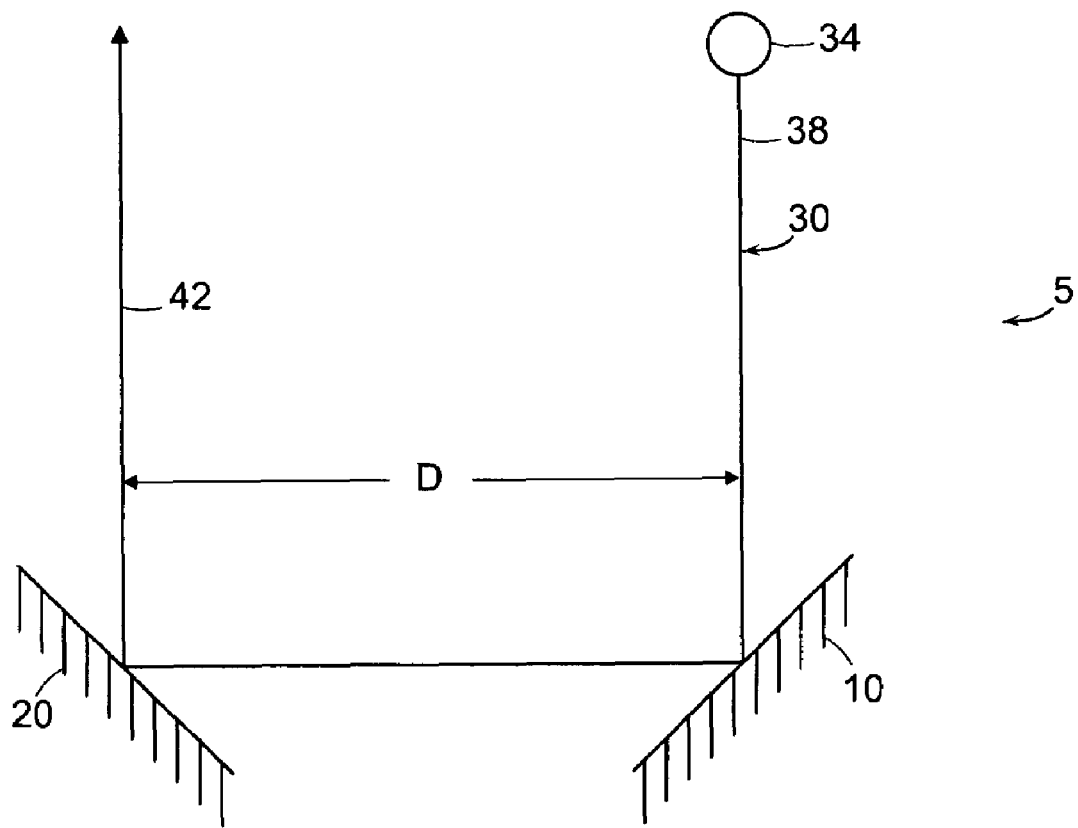
FIG. 1 is a diagram of a light ray being reflected by two dimensional depiction of a two-dimensional retroreflector.

Retroreflectors, usually consisting of three mutually perpendicular intersecting flat reflecting surfaces, return a reflected incident light beam in the direction of its point of origin. An example of a two dimensional retroreflector, in the form of a corner cube reflector 5, is shown in FIG. 1. The corner cube reflector 5 includes two reflective surfaces 10 and 20 oriented 90 degrees to each other. A light ray 30, from a source 34, incident at 45 degrees with respect to the first reflective surface 10 is reflected toward the second reflective surface 20. This second reflecting surface 20 reflects the light ray 30 back in the direction of the source 34. The reflected portion 42 of the light ray 30 is reflected parallel to the incident portion 38 of the light ray 30. The distance (D) between the incident portion 38 of the light ray 30 and the reflected portion 43 is determined by the distance between the reflecting surfaces 10, 20.

Figure 2A:
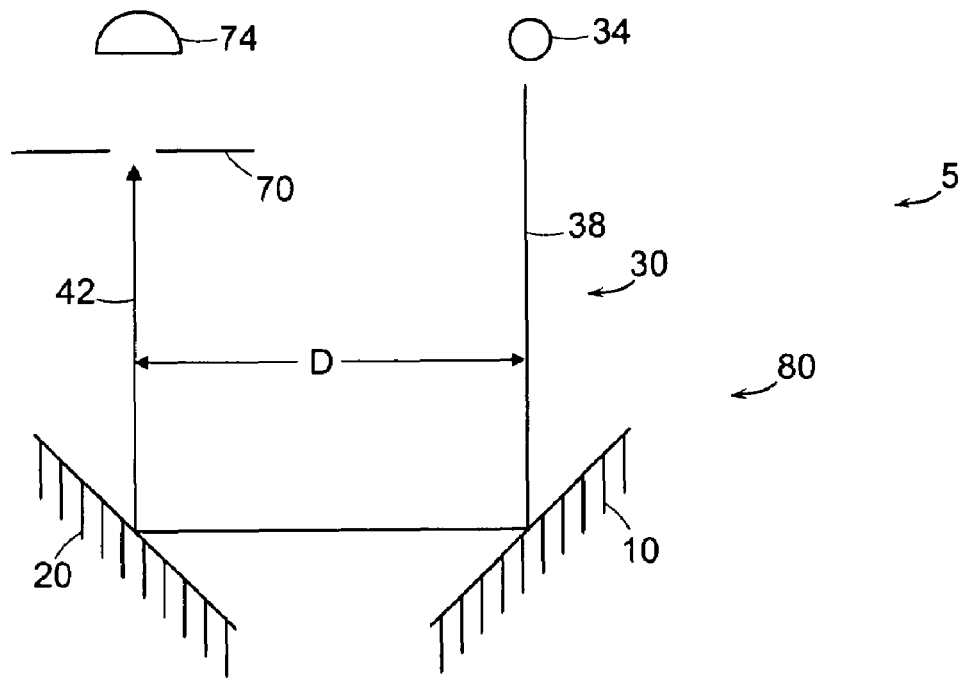
FIGS. 2(a, b) are two dimensional depictions of a light ray entering a two-dimensional retroreflector with the reflective surface at various positions.

Referring to FIG. 2a, by adjusting the positions of the reflective surfaces 10, 20 relative to each other, the outgoing ray 43 may be translated, such that the distance (D) between the incident portion 38 and the outgoing portion 42 of the light ray 30 varies. In one embodiment of the invention, the first reflective surface 10 is movable, in a direction perpendicular to the reflective surface 10. By moving the first reflective surface 10 while maintaining its orientation with respect to the second reflective surface 20 the distance (D) between the incident portion 38 of the ray and the outgoing 42 portion of the light ray 30 may be altered.

Thus, as the first reflective surface 10 moves, the outgoing portion 42 of the ray 30 translates across an aperture 70 located in the path of the outgoing portion 42 of the ray 30. This change in displacement of the outgoing portion of 42 of the ray 30 determines whether the outgoing portion 42 of the ray 30 will be able to pass through the aperture 70 and reach a detector 74.

In more detail, FIG. 2a shows one light ray 30, reflecting off of the first reflective surface 10, then reflecting off of the second reflective surface 20 to produce the outgoing portion 42 of the ray 30, parallel to and reversed 180 degrees with respect to the incident portion 38 of ray 30. At this location 80 of the first reflecting surface 10, the outgoing portion 42 of the ray 30 then travels through an aperture 70 to reach detector 74.

Figure 2B:
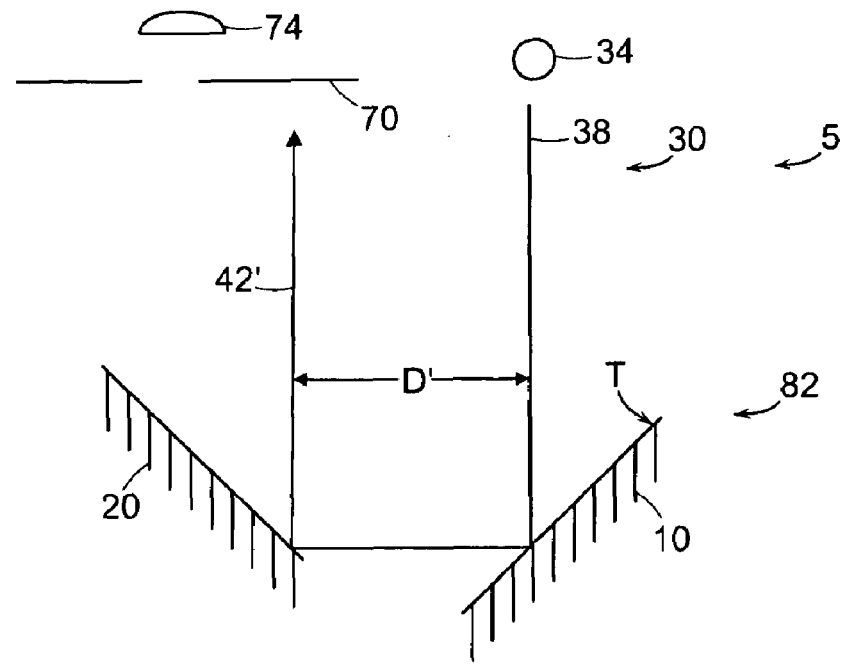

Referring to FIG. 2b, by shifting (arrow T) the location 82 of the first reflective surface 10 the distance (D') between the incoming portion 38 of the ray 30 and the outgoing ray 42' changes. This displacement in the outgoing portion 42' of the ray 30 causes the ray 30 not to go through the aperture 70 and is thus not seen by the detector 74.

Figure 3A:
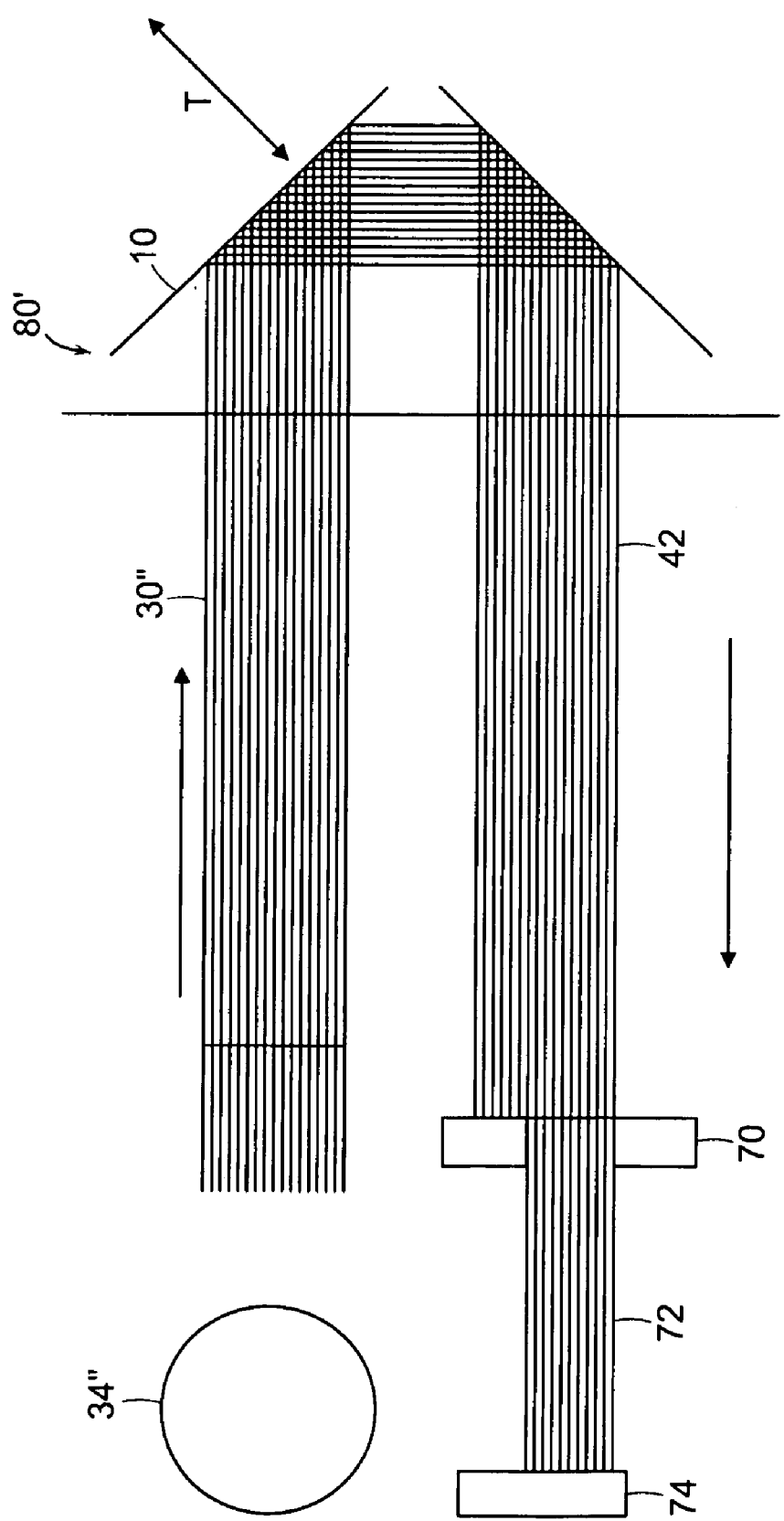
FIGS. 3(a, b) are two dimensional depictions of a light beam comprising many rays entering a two-dimensional retroreflector with the reflective surface at various positions.
Figure 3B:
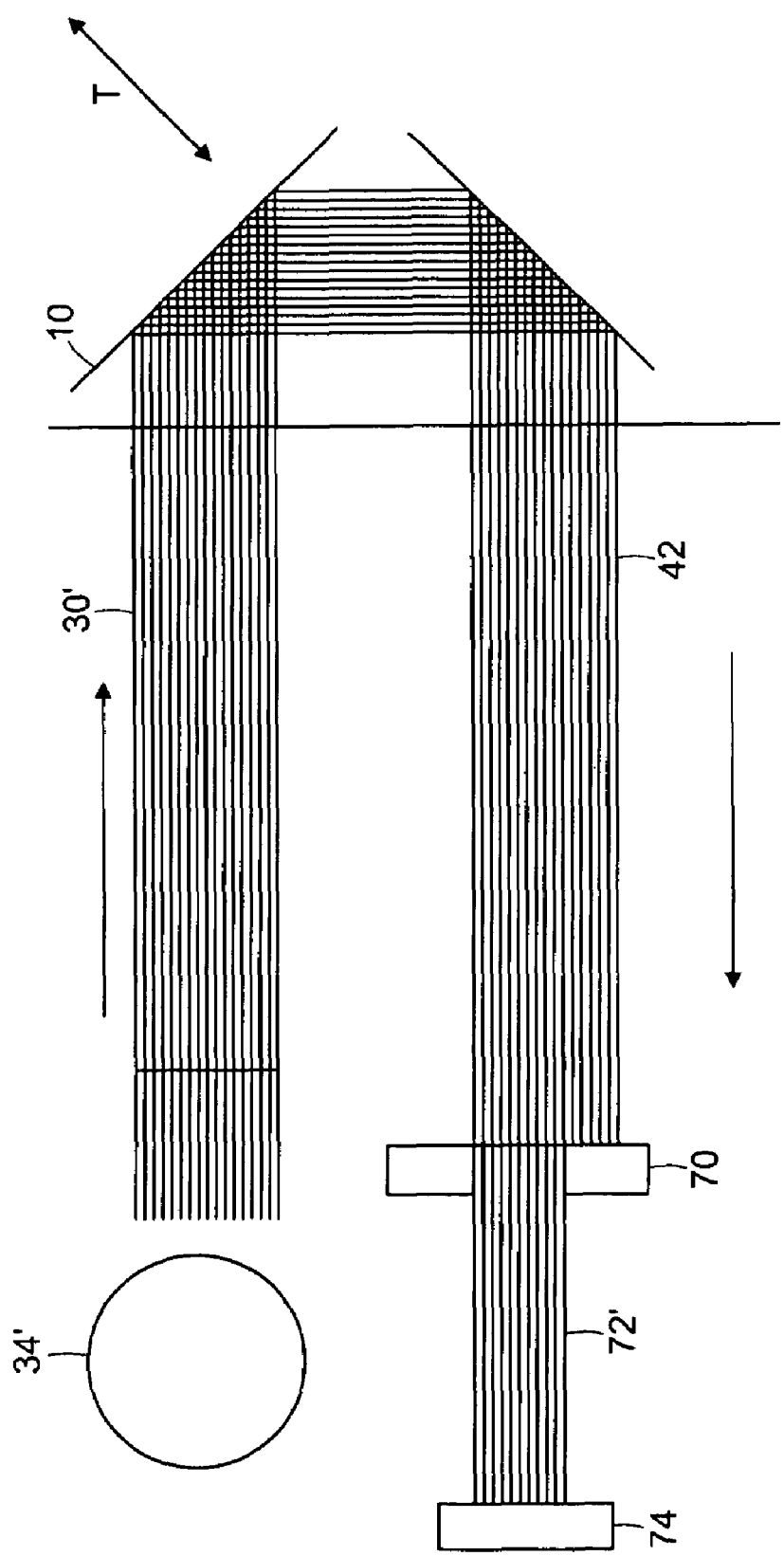

Referring to FIG. 3a, when a beam made up of many rays of light 30' is considered, for example from an extended source 34', again at the first location 80' of the reflective surface 10 multiple light rays will be reflected toward the aperture 70 and only a few 72 will pass through to the detector 74 as in the case of the single ray 30 in FIG. 2a. Referring also to FIG. 3b, as the first reflective surface 10 is moved, (arrow T) those rays 72' which previously passed through the aperture 70 to reach the detector 74 will not translate across the aperture 70 and no longer reach the detector 74, while some other rays 72' originally blocked by the aperture 70 will now pass through the aperture 70 and reach the detector 74 again as occurred with the single ray 30 in FIG. 2b.

As the first reflective surface 10 moves back and forth, the different rays that make up the outgoing portion 42 of beam 30 will pass through the aperture 70 and reach the detector 74 at a different point on the detector surface. Thus, although the beam 42 may vary in intensity across its width, the movable reflective surface 10 in conjunction with the aperture 70 creates an averaged resultant image on the detector 74 with greater uniformity of intensity. Every pixel of a multi-pixel detector, will see over time, approximately the same average amount of light as every other pixel if the first reflective surface 10 moves through several cycles over the course of an exposure. Therefore, the retroreflector 5 creates conditions that promote detection of a more uniform light beam when averaged over time.

Figure 4A:
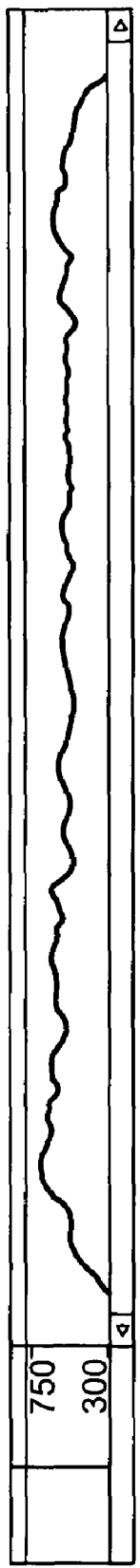
FIG. 4a is a plot of the intensity of light across the detector face as seen by a detector viewing a diode source.
Figure 4B:
FIG. 4b is a plot of the intensity of light across the detector face as seen by a detector viewing a diode source as averaged by an embodiment of the invention.

FIG. 4a shows the measured value of the intensity of light as seen across the detector face when the detector is viewing a diode laser source. The peaks in the intensity plot are caused by "hot spots" in the facet of the diode laser. FIG. 4b shows the measured value of the intensity of light as seen across the detector face when the detector is viewing a diode laser source that has been averaged using the invention. The peaks and valleys in the intensity plot, caused by mode structure in the laser, are averaged out as the image is moved across the detector by the movement of the first reflector.

In various embodiments the reflective surfaces 10, 20 are preferably silvered mirrors, but may be composed of any reflective material. Although the invention has been described in terms of moving the first reflective surface 10 in a direction perpendicular to the surface, in another embodiment, the second reflective surface 20 is movable. In another embodiment, both reflective surfaces are movable in opposite directions at the same time.

The reflective surfaces may be translated by any reciprocating means, such that the orientation of the reflective surfaces relative to the beam and each other remains constant. Additionally, in order to make the beam uniform in across both dimensions of the surface of the detector, the first reflective surface 10 may be rotated so a normal to the surface points in a direction that is at 45 degrees to both axes of the incident beam and moves at a 45 degree angle to both the incident beam and the beam reflected to the second surface reflector.

The reflective surface can be driven by any reciprocating means; for example a motor driven cam. In another embodiment, the first reflective surface is mounted to the speaker cone of a subwoofer. In other embodiments the reflective surface is moved using a piezoelectric transducer. In one embodiment the subwoofer or piezoelectric transducer is driven by a sinusoidal wave. In other embodiments, the reflective surface is driven by other types of waves. In another embodiment, the second reflective surface is driven by a second subwoofer. In still another embodiment, both reflective surfaces are driven by respective subwoofers.

Figure 5:
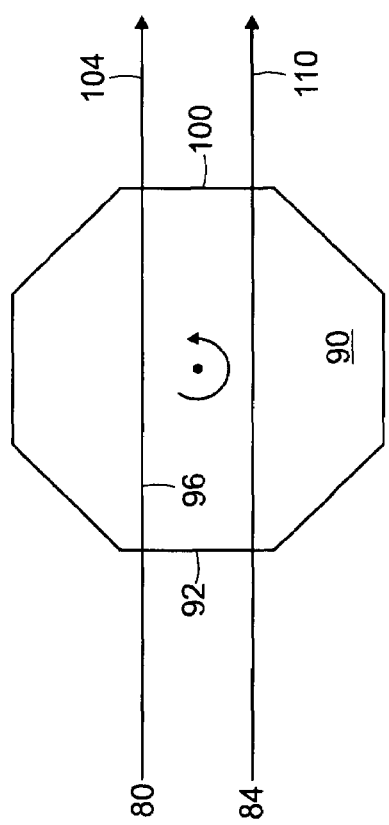
FIG. 5 is a two-dimensional depiction of two light rays entering a transparent polygon at normal (90 degree) incidence.

In another embodiment, a rotating polygon may be used to create a beam of uniform intensity from a laser beam. As shown in FIG. 5, two incident light rays 80, 84 enter the polygon 90, perpendicular to the surface 92 of the polygon 90. Using one incident ray 80 as an example; the incident ray 80 is at normal incidence (90 degrees) to the air/polygon interface 92, and thereby results in the transmitted ray 96 being also perpendicular to that interface 92. When the transmitted ray 96, now the incident ray at the polygon/air interface 100 exits the polygon 90, the incident ray 96 and transmitted ray 104 are both perpendicular to the interface 100. Therefore, the ray 80 incident to the polygon 90 and the ray 104 transmitted out through the polygon 90 have the same orientation, i.e., they are both perpendicular to the surface of the polygon. Thus, at normal incidence, an incoming ray passes straight through the polygon. The same process affects the other incident ray 92 depicted in FIG. 5.

Figure 6A:
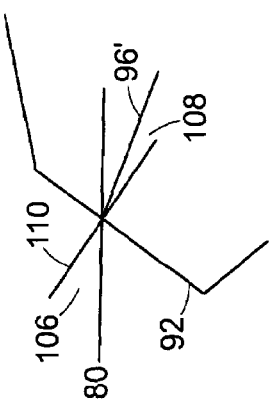
FIG. 6a is an enlargement of a portion of FIG. 6.
Figure 6:
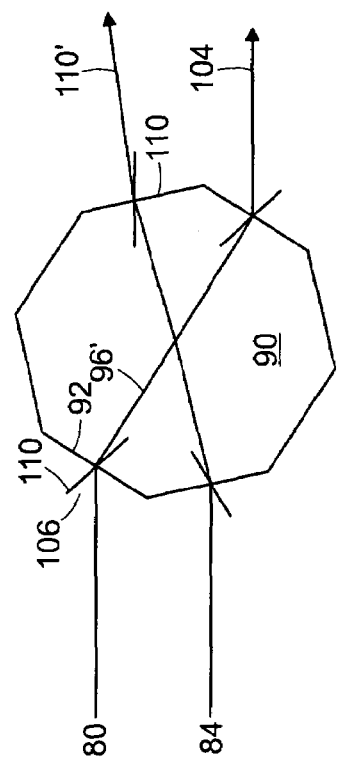
FIG. 6 is a two-dimensional depiction of two light rays entering a transparent polygon at an angle of incidence other than 90 degrees.

Referring to FIG. 6, as the polygon 90 is rotated, the angle of incidence 106 to the air-polygon interface 92 changes, thus changing the angle of refraction 108 inside the polygon 90. (FIG. 6a is an enlargement to clearly show these angles.) For example, incident ray 80 meets the interface 92 of the polygon at an angle 106 that is not normal to the polygon surface 92 and #, the beam 96' within the polygon 90 is refracted toward the normal 110 of the interface 92 at an angle 108 as dictated by Snell's Law. The ray 96' passes through the polygon 90 and becomes the incident ray at the polygon-air interface 110. Because the light is passing from the material into air the incident ray 96' is refracted away from the normal to the surface resulting in the transmitted ray 104'. The same process affects the other incident ray 84 depicted in FIG. 6. As the polygon 90 is rotated, the beams are deflected less and eventually when the interface 92 is again perpendicular to the beam the light passes through the polygon as described above with regard to FIG. 5. The result is such that the transmitted rays 104 and 110 walk across each other as the polygon is rotated.

Figure 7A:
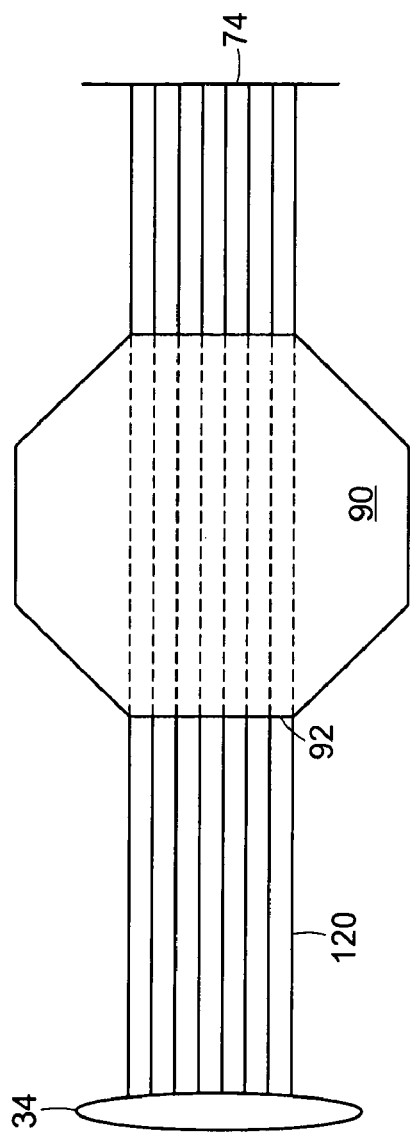
FIG. 7(a, b) is a two-dimensional depiction of a light beam comprising many rays entering a transparent polygon, at an angle of incidence other than 90 degrees.
Figure 7B:
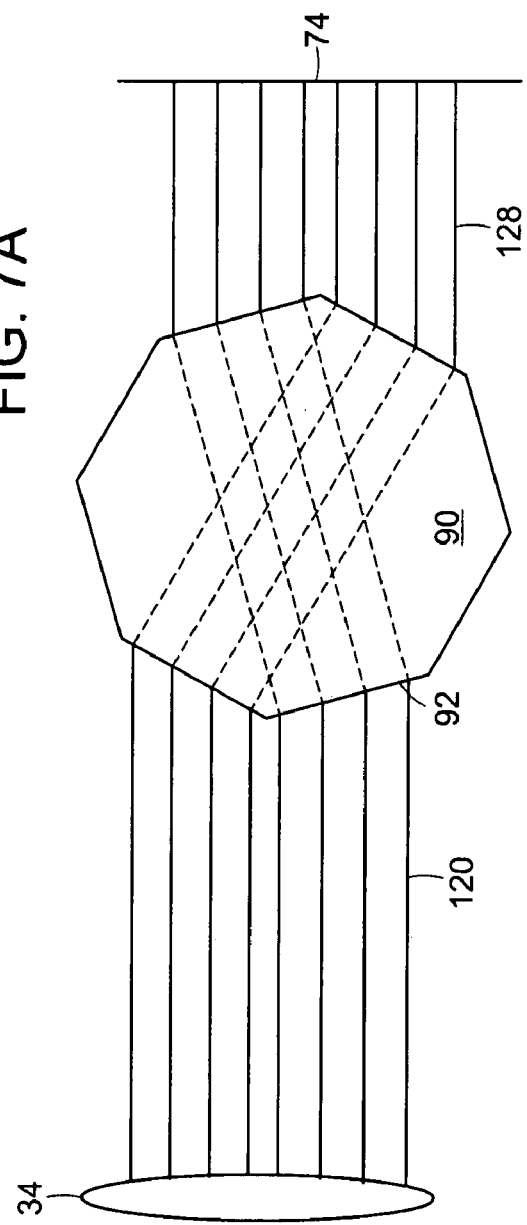

Referring to FIG. 7a, when a beam 120 made up of many rays of light is considered, for example from an extended source 34, is incident to the surface 92 at an angle of 90°, the beam 80 will pass straight through the polygon 90 to a detector 74. Referring also to 7b, as the polygon 90 is rotated the angle of incidence of the rays with respect to the interface 92 changes, changing the angle of refraction and the point on the opposite surface of the polygon 90, where the beam 128 will exit and reach the detector 74. As the polygon 32' rotates, the rays of the beam will walk across each other such that each part of the detector 74 will detect substantially the same intensity of light over time. Thus, the rotating polygon 90 provides a way to spatially average the intensity of the beam over the width of the beam 120.

The polygon may be composed of any material able to transmit light rays. In the embodiment shown, the polygon is an octagon, but any polygon can be used. The preferred embodiment uses a glass polygon, with an index of refraction greater than about 1.9. The polygon may be rotated at various speeds to obtain the correct level of uniformity of intensity. In the preferred embodiment the polygon is rotated at a speed about twice the exposure time.

Variations, modification, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A method of increasing the detected spatial uniformity of the intensity of a beam of light from a laser in a system including the laser and a light detector, the method comprising the steps of:
    generating a beam of light with the laser; and
    moving the beam of light and the light detector relative to each other, such that the detector averages the spatial intensity of the beam of light over time.

2. The method of claim 1, wherein the step of moving the beam comprises the step of passing the beam of light into a retroreflector and moving a reflective wall of said retroreflector.

3. The method of claim 1, wherein the retroreflector is a corner cube reflector.

4. The method of claim 1, wherein the step of moving the beam comprises physically moving the light source relative to the detector.

5. The method of claim 1, wherein said detector is exposed to only a portion of the beam at any one time.

6. The method of claim 1, wherein the step of generating the beam of light with a laser comprises generating the beam of light with a diode laser.

7. A system for increasing the detected spatial uniformity of the intensity of a beam of light comprising:
    a light detector;
    a laser source for generating said beam of light; and
    a means for moving the beam of light and the detector relative to each other such that the detector averages the intensity of the light beam over time.

8. The system of claim 7 wherein the means for moving comprises a retroreflector having a moving reflective wall into which is passed the beam of light.

9. The system of claim 7 wherein the means for moving comprises a rotating transparent polygon through which is passed the beam of light.

10. A system for increasing the detected spatial uniformity of the intensity of a beam of light comprising:
    a light detector;
    a laser source for generating said beam of light; and
    a translator moving the beam of light and the detector relative to each other such that the detector averages the intensity of the light beam over time.

11. The system of claim 10 wherein said laser source is a laser diode.

12. The system of claim 10 wherein the translator comprises a retroreflector having a moving reflective wall into which is passed the beam of light.

13. The system of claim 10 wherein the translator comprises a rotating transparent polygon through which is passed the beam of light.

14. The system of claim 10 wherein the translator comprises a translator physically moving the light source relative to the detector.

* * * * *